Sept. 20, 1971      W. G. PIERCE      3,606,437
TRUCK TRACTOR CAB SUSPENSION SYSTEM
Filed Aug. 21, 1969
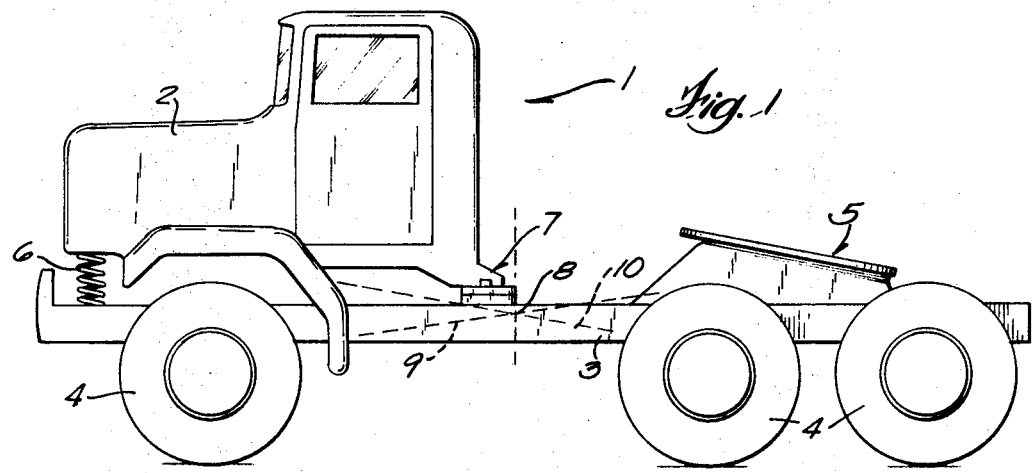
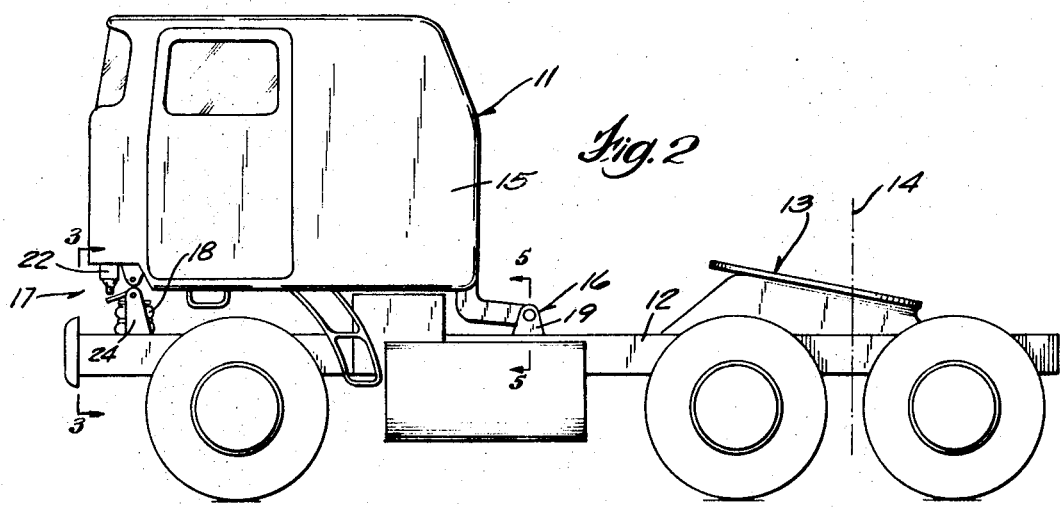
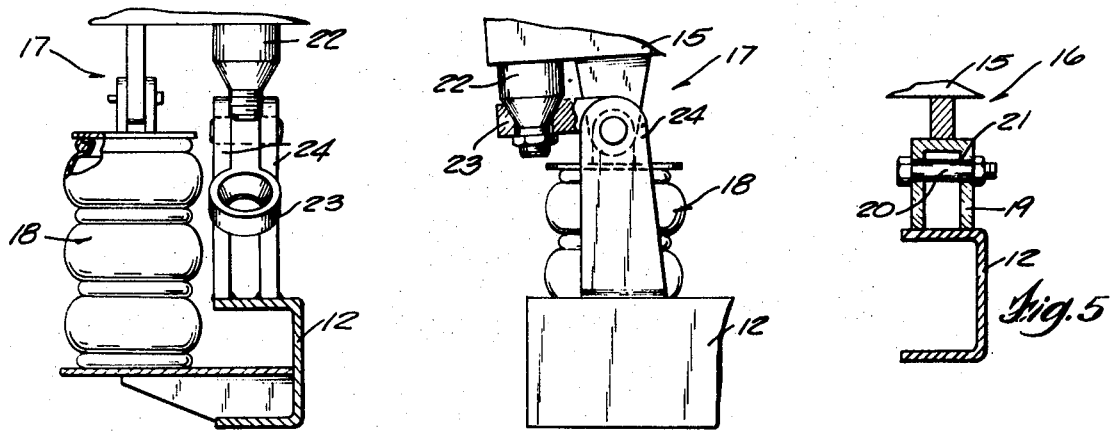
Inventor
William G. Pierce

United States Patent Office 3,606,437
Patented Sept. 20, 1971

3,606,437
TRUCK TRACTOR CAB SUSPENSION SYSTEM
William G. Pierce, Milwaukee, Wis., assignor to
A. O. Smith Corporation, Milwaukee, Wis.
Filed Aug. 21, 1969, Ser. No. 852,020
Int. Cl. B62d 23/00
U.S. Cl. 296—35      3 Claims

ABSTRACT OF THE DISCLOSURE

A suspension system for truck tractor cabs includes low rate cushion devices as front cab-to-chassis mounts and relatively rigid cab-to-chassis mounts placed near the pitch nodal axis of the tractor chassis, at the rear of the cab, thus substantially isolating the cab from the pitch of the tractor chassis.

BACKGROUND OF THE INVENTION

This invention relates to a cab mounting system for highway and off-highway tractor cabs, and more particularly, to a cab suspension arrangement having characteristics which attenuate cab pitch.

It has been known for a long while that many highway tractors exhibit very uncomfortable ride characteristics resulting from chassis pitch. This disturbance is frequently encountered at expressway speeds, where tar strips and slab cracks provide regular and sustaining inputs. Even transient inputs or a single bump can excite this pitch condition.

There are two modes in which this fore-and-aft pitch manifects itself. The first, and usually most severe condition, occurs when front and rear suspension motions are out of phase with each other. This is often referred to as the "pitch mode" in which the pitch axis is roughly at mid-length of the tractor chassis, and normally behind the cab. The second condition occurs with front and rear suspension motions in phase with each other, and is referred to as "bounce mode."

Although all varieties of tractors exhibit pitch motion to some extent, it appears to be most uncomfortable in cab-over-engine rigs, where the cab is quite high. Further, severity of pitch is usually more pronouced when a loaded trailer is coupled to the tractor. This pitch or shake problem has been severe enough to attract considerable engineering attention and previous work has been directed toward wheel suspension systems, fifth wheel geometry and location, tires, shock absorbers, and frame structure. However, most proposals for pitch improvement have required either compromises with other engineering qualities or rather expensive components.

SUMMARY OF THE INVENTION

The above problems are solved by the invention and further advantages will be apparent from the description.

The invention contemplates hinging the cab at the rear, near the pitch nodal axis, rather than at the front as in conventional practice with cab-over-engine tractors. Isolation from chassis pitch is provided by mounting the front of the cab on the frame with pneumatic, hydraulic, mechanical or the like spring cushions having much lower rates than conventional mounts.

The design of the front cushions provides a spring rate which results in a cab natural frequency substantially lower than the chassis pitch frequency as determined by vibration formulae. Furthermore, the invention attenuates cab pitch without exceeding acceptable static deflection of the cab.

The rear mounts are constructed to act as pivots in fore-and-aft pitch, but also to remain comparatively rigid in other directions, in order to provide cab stability.

However, the rear mounts have spring rates which furnish isolation from high frequency chassis vibrations, such as noise, harshness, engine and drive line vibrations.

The figures illustrate the best embodiments of the invention which are presently contemplated.

In the drawings:

FIG. 1 is a general illustration of the basic features of the invention shown in side elevation with parts cut away;

FIG. 2 is a side elevational view of the invention as employed in a cab-over-engine tractor embodiment;

FIG. 3 is a partial front elevational view of one type of front mounting arrangement taken on line 3—3 of FIG. 2;

FIG. 4 is an enlarged side view of a portion of FIG. 2; and

FIG. 5 is an elevational view of one type of rear mounting arrangement taken on line 5—5 of FIG. 2.

DESCRIPTION

Shown in the general illustration of FIG. 1 is a conventional truck tractor 1, having a cab body 2 and chassis frame member 3, from which the wheels 4 are suspended in the usual manner. Not shown, is a trailer which is coupled to tractor 1 by the fifth wheel 5 as in the conventional construction. The trailer load is communicated to tractor 1 at the mounting location of fifth wheel assembly 5.

At the front of cab 2, one low rate cushion is shown such as a coil spring 6. Spring 6 is mounted on the front of chassis frame 3 and by suitable means to the front portion of cab 2 and comprises the front cab mount. One or more of such mounts may be employed.

As illustrated in a general fashion, rear mount 7 shown here as a resilient sandwich mount, connects the rear of cab 2 to chassis frame member 3, generally near the pitch nodal axis of the chassis 3 indicated by the point 8. One or more of such mounts may be employed. Dotted lines 9 and 10 illustrate the pitch motion of chassis 3 when the tractor is moving over an irregular surfaced highway.

The precise valves for the spring rate of spring 6 and for the location of the pitch nodal axis 8 will depend on the dimensions, weight distribution and other characateristics of the truck. The spring 6 is sufficiently low rate so that the cab pitch natural frequency is less than .707 times the chassis pitch frequency. Thus, a chassis pitch frequency of four cycles per second (c.p.s.) will require less than 2.8 c.p.s., preferably round 1 c.p.s. These requirements govern the rate for spring 6, which should strike a satisfactory compromise between the desirable pitch attenuation and acceptable static deflection at the frount of cab 2.

Location of the pitch axis is a function of several tractor characteristics, including front and rear suspension spring rates, weight distribution, fifth wheel location, etc. For purposes of this invention, it is not mandatory that rear cab mount 7 be located precisely at the pitch nodal axis 8. It is desirable, though, that the mount 7 be positioned in the vicinity of pitch axis 8. Preferably, the rear cab mounts are longitudinally located within at least twenty inches of pitch nodal axis 8 and vertically at least within four inches of pitch nodal axis 8. The closer to nodal axis 8 that rear cab mount 7 can be located, and this may be governed by available space, the better the results in overcoming the pitch problem.

With the rear mount 7 located adjacent to or at the nodal axis 8 as described and the employment of the described low rate, front mount 6, cab 2 will pitch at a substantially lower amplitude than the chassis 3 and effectively pivot about the relatively rigid rear mount 7 when the chassis 3 is undergoing severe pitch.

Referring now to FIG. 2, a cab-over-engine tractor 11 has the usual chassis 12.

Fifth wheel assembly 13 is mounted on chassis 12 generally slightly forward of the rear suspension centerline 14, thus constituting the usual trailer loading point.

Tractor cab 15 is spaced above chassis 12 as in the conventional design and has a rear mount 16 and front mount 17 supporting it upon chassis 12. As described with respect to the conventional truck tractor, mounts 16 and 17 may respectively be one or more in number located on a cross bar centrally of the chassis frame in the case where one mount 16 and 17 is used or on the chassis frame itself where two mounts 16 and 17 respectively are employed. And as with the conventional truck tractor the rear mount 16 is located at or near the pitch nodal axis. The closer to the pitch nodal axis that rear cab mount 16 can be located the better results in overcoming the pitch problem. Again, space requirements may govern the location of the rear mount but preferably the mount 16 is longitudinally located within at least twenty inches of the pitch nodal axis, and vertically at least within four inches of the pitch nodal axis.

The front mount 17 is secured to the chassis 12 at the front of the cab 15 and is illustrated in FIG. 4 as an air spring 18 of the bellows type with a low spring rate.

As in the case of the embodiment described with respect to FIG. 1, the air spring 18 is of sufficiently low rate so that the cab pitch natural frequency is less than .707 times that of the chassis pitch frequency. Thus, a chassis pitch frequency of four cycles per second will require less than 2.8 c.p.s., preferably around one c.p.s. and these requirements govern the rate for air spring 18.

Rear mount 16 is shown in FIG. 2 as secured to chassis 12 by means of a clevis 19 or the like affixed to chassis 12. A pin 20 extends through clevis 19 and bushing 21 of mount 16 so that upon removal of pin 20, cab 15 can be tilted forwardly to expose the engine of the tractor.

The combination of mounts 16 and 17 operate to isolate cab 15 from the pitch of chassis 12. As chassis 12 pitches, as for example, in response to the bounce by the tandem tires over regular slab joints, cab 15 would ordinarily tend to pitch similarly. Being near the nodal axis for this mode, mount 16 with experience little displacement from the pitching chassis. Thus, cab 15 will effectively pivot about mount 16, and front mount 17 will provide the isolation from chassis pitch. Front mount 17 being of low rate, cab 15 will pitch at a much lower amplitude than chassis 12 to provide the desired smooth ride.

It is desirable that cab 15 when tilted forwardly to gain access to the engine be supported other than on front mount 17. This can be accomplished in a number of different ways and forms no part of the invention.

However, as illustrated in FIGS. 3 and 4, cab 15 may be supported on chassis 12 by posts 22 which are secured to the front of the cab (only one post being shown) and are received respectively within pivot arm 23 pivoted to mount 24 in turn secured to chassis 12. When cab 15 is to be tilted forwardly, each arm 23 is pivoted upwardly to receive its respective post 22, which is bolted thereto.

When cab 15 is then tilted forwardly, cab 15 overrides air spring 18 and is supported directly on chassis 12.

There are several other well known apparatus which necessarily will be employed with the invention. Since they form no part of the invention, reference only in general is made to such apparatus.

Since the front cab to frame cushions are low rate, they will have correspondingly large deflections. Consequently, it will be desirable to use a suitable load leveling device which will adjust the statically loaded cab to near its mid-portion, regardless of passenger weight. In addition, some damping of cab-to-chassis motion may be necessary regardless of whether the damping structure may be integral with the spring system or a separate shock absorber. Furthermore, in order to limit the lateral cab motion, it may be desirable to employ a transverse stabilizer bar of the type commonly used in passenger cars.

Thus, the invention provides pitch attentuation for tractor cabs of all types while retaining the desirable stability of the cab and without compromising other design requirements of the tractor.

The foregoing embodiments are the best examples of the various modes of carrying out the invention. The claims particularly point out and distinctly claim the subject matter which is regarded as the invention.

I claim:

1. In a trailer truck tractor having a tractor chassis from which front and rear wheels are suspended and with a cab disposed above the chassis, the chassis having a normal pitch plane with a nodal axis near the rear of the cab; a cab-to-frame mounting assembly comprising: rear mounting means disposed on the chassis near said nodal axis and connected to said cab for supporting the cab upon the chassis in a comparatively rigid fashion; and spring means supporting the front of the cab upon a forward portion of the chassis, said spring means having a low rate and being extendable for permitting substantial relative movement between the chassis and the cab, whereby the pitching response of the cab to the pitch of the chassis is attenuated.

2. The structure of claim 1, wherein the low rate spring means at the forward portion of the chassis has a spring rate which provides a cab pitch frequency less than .707 times the frequency of the chassis pitch.

3. The structure of claim 1, wherein the rear mounting means has a pivot mount supported by the chassis, said pivot mount being longitudinally disposed at least within twenty inches of the pitch nodal axis and vertically disposed at least within four inches of said axis.

References Cited

UNITED STATES PATENTS

| | | | |
|---|---|---|---|
| 3,051,259 | 8/1962 | Lorenz | 296—35 |
| 3,361,444 | 1/1968 | Harbers | 267—64 |

JAMES B. MARBERT, Primary Examiner

U.S. Cl. X.R.

267—120